(12) United States Patent
Huang et al.

(10) Patent No.: US 7,694,310 B2
(45) Date of Patent: Apr. 6, 2010

(54) METHOD FOR IMPLEMENTING MPI-2 ONE SIDED COMMUNICATION

(75) Inventors: Su-Hsuan Huang, Fishkill, NY (US); Chulho Kim, Poughkeepsie, NY (US); Richard R. Treumann, Highland, NY (US); William G. Tuel, Jr., Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 11/467,946

(22) Filed: Aug. 29, 2006

(65) Prior Publication Data

US 2008/0127203 A1 May 29, 2008

(51) Int. Cl.
- G06F 3/00 (2006.01)
- G06F 9/44 (2006.01)
- G06F 9/46 (2006.01)
- G06F 13/00 (2006.01)

(52) U.S. Cl. .......................... 719/319; 719/313; 709/213
(58) Field of Classification Search .................. 719/319; 709/213
See application file for complete search history.

(56) References Cited

OTHER PUBLICATIONS

Banikazemi et al, Implementing Efficient MPI on LAPI for IBM RS/6000 SP Systems: Experiences and Performance Evaluation, The Ohio State University and IBM Power Parallel System, 1999, pp. 1-8.*

Jackson, LAPI on HPS Evaluating Federation, HPCX, Aug. 2004, pp. 1-22.*

Treumann, MPI—Today and Tomorrow, IBM, Mar. 26, 2004, pp. 1-28.*

IBM, LAPI Programming Guide, IBM, 2004, pp. 1-296.*

Su Huang et al., DZM: MPI One-sided Exploitation of LAPI API's Component Design, Communication Protocols & Application Tools Development, Mar. 16,2006, IBM Corporation Poughkeepsie, NY.

* cited by examiner

*Primary Examiner*—Diem K Cao
(74) *Attorney, Agent, or Firm*—Cantor Colburn LLP; Gerry Monteleone

(57) ABSTRACT

A method for implementing Message Passing Interface (MPI-2) one-sided communication by using Low-level Applications Programming Interface (LAPI) active messaging capabilities, including providing at least three data transfer types, one of which is used to send a message with a message header greater than one packet where Data Gather and Scatter Programs (DGSP) are placed as part of the message header; allowing a multi-packet header by using a LAPI data transfer type; sending the DGSP and data as one message; reading the DSGP with a header handler; registering the DSGP with the LAPI to allow the LAPI to scatter the data to one or more memory locations; defining two sets of counters, one counter set for keeping track of a state of a prospective communication partner, and another counter set for recording activities of local and Remote Memory Access (RMA) operations; comparing local and remote counts of completed RMA operations to complete synchronization mechanisms; and creating a mpci_wait_loop function.

18 Claims, 2 Drawing Sheets

METHOD FOR IMPLEMENTING MPI-2 ONE SIDED COMMUNICATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to communication protocols and application tools development, and particularly to a method for implementing Message Passing Interface (MPI-2) one-sided communication by using Low-level Applications Programming Interface (LAPI) active messaging capabilities.

2. Description of Background

High computational power of personal computers (PCs) combined with the emergence of low latency and high bandwidth interconnects has led to the trend of cluster computing. In this area, Message Passing Interface (MPI) has become the standard for writing parallel applications. MPI-2 has been introduced as an enhancement of MPI-1 with one-sided communication as one of its main additional features.

In MPI-2 one-sided communication, the sender can access some part of the remote address space directly. Such one-sided communication is also referred to as Remote Memory Access (RMA) or RMA communication. The area of memory on the target process accessible by the origin process is referred to as a Window. The MPI-2 specification defines various communication operations. These may include: (1) an MPI Put operation that transfers data to a window in the target process, (2) an MPI Get operation that transfers data from a window in the target process, and (3) an MPI Accumulate operation that combines data movement to target with a "reduce" operation. As per the semantics of one-sided communication, the return of the one-sided communication call does not guarantee the completion of the transfer. In order to guarantee the completion of one-sided operation, the user must call one of three synchronization functions defined by the MPI standard.

In MPI-2 terminology the initiating process is referred to as the origin, while the process whose memory is being accessed remotely is referred to as the target. Contrast to this is point-to-point message passing where both processes are explicitly involved in the communication. The model most suited for a given problem is determined by the algorithmic structure of the application. An important effect of one-sided communication is that communication is explicitly separated from synchronization, allowing for synchronization overhead to be amortized over several communication operations.

In addition, for one-sided communication, processes logically expose part of their memory to RMA by other processes, where the memory is the memory allocated in the private address space as process local memory. This concept is realized in MPI-2 by the definition of communication windows.

LAPI (Low-level Applications Programming Interface) is a low-level, high-performance communication interface. LAPI provides an active message-like interface along with remote memory copy and synchronization functionality. LAPI is an asynchronous communication mechanism intended to provide users the flexibility to write parallel programs with dynamic and unpredictable communication patterns. LAPI is architected to be an efficient (low latency, high bandwidth) interface. In order to keep the LAPI interface as simple as possible, it is designed with a small set of primitives. However, the limited set does not compromise on functionality expected from a communication.

Furthermore, LAPI is also a communications library available as part of software from IBM, and is designed with the following primary objectives in mind: performance, flexibility, and extensibility. The primary design consideration for LAPI is to define syntax and semantics that allow efficient implementation on the underlying hardware and software communications infrastructure. LAPI is based on the remote memory copy (RMC) model. RMC is a one-sided programming paradigm similar to the load/store model of shared memory programming. The one-sided model eases some of the difficulties of the send/receive model, which uses two-sided protocols. In addition to a set of basic functions, LAPI also provides the active message style interface. With this interface, users can add additional communications functions that are customized for their specific application or environment.

The initial implementation of MPI one-sided communication was delivered prior to MPI adopting LAPI as its transport layer and used a Message Passing Client Interface (MPCI) send and receive functionality along with the responder capability. The responder was activated when the window was created. MPI-2 one-sided operations were carried out by sending command messages from an origin to a target and by using MPCI responders to post the MPCI receive or send that matches sends and receives posted at the origin. Each responder action paid the cost of a thread activation and normally of a context switch, with a serious impact on application progress.

Therefore, the initial of MPI-2 one-sided communication did not exploit the one sided capability provided by LAPI. Considering the limitations of the aforementioned methods, it is clear that there is a need for a method for implementing MPI-2 one-sided communication that exploits the one-sided capability provided by LAPI.

SUMMARY OF THE INVENTION

The shortcomings of the prior art are overcome and additional advantages are provided through the provision of a method for implementing Message Passing Interface (MPI-2) one-sided communication by using Low-level Applications Programming Interface (LAPI) active messaging capabilities, the method comprising: supporting a plurality of data transfer types; providing at least three data transfer types, one of which is used to send a message with a message header greater than one packet where Data Gather and Scatter Programs (DGSP) are placed as part of the message header; allowing a multi-packet header by defining a new LAPI data transfer type; sending the DGSP and data as one message; reading the DGSP and registering the DGSP in the header handler to allow the LAPI to scatter the data to one or more memory locations; defining two sets of counters, one counter set for keeping track of a state of a prospective communication partner, and another counter set for recording activities of local and Remote Memory Access (RMA) operations; comparing local and remote counts of completed RMA operations to determine when to return from an MPI-2 one-sided synchronization function; and creating a mpci_wait_loop function for awaiting the completion of RMA operations.

The shortcomings of the prior art are overcome and additional advantages are provided through the provision of a system for implementing Message Passing Interface (MPI-2) one-sided communication by using Low-level Applications Programming Interface (LAPI) active messaging capabilities, the system comprising: a network; and a host system in communication with the network, the host system including software to implement a method comprising: supporting a plurality of data transfer types; providing at least three data transfer types, one of which is used to send a message with a message header greater than one packet where Data Gather and Scatter Programs (DGSP) are placed as part of the message header; allowing a multi-packet header by defining a new LAPI data transfer type; sending the DGSP and data as one message; reading the DGSP and registering the DGSP in the header handler to allow the LAPI to scatter the data to one or more memory locations; defining two sets of counters, one counter set for keeping track of a state of a prospective communication partner, and another counter set for recording activities of local and Remote Memory Access (RMA) operations; comparing local and remote counts of completed RMA operations to determine when to return from an MPI-2 one-sided synchronization function; and creating a mpci_wait_loop function for awaiting the completion of RMA operations.

The shortcomings of the prior art are overcome and additional advantages are provided through the provision of a computer program product for implementing Message Passing Interface (MPI-2) one-sided communication by using Low-level Applications Programming Interface (LAPI) active messaging capabilities, the computer program product comprising: a storage medium readable by a processing circuit and storing instructions for execution by the processing circuit for performing a method comprising: supporting a plurality of data transfer types; providing at least three data transfer types, one of which is used to send a message with a message header greater than one packet where Data Gather and Scatter Programs (DGSP) are placed as part of the message header; allowing a multi-packet header by defining a new LAPI data transfer type; sending the DGSP and data as one message; reading the DGSP and registering the DGSP in the header handler to allow the LAPI to scatter the data to one or more memory locations; defining two sets of counters, one counter set for keeping track of a state of a prospective communication partner, and another counter set for recording activities of local and Remote Memory Access (RMA) operations; comparing local and remote counts of completed RMA operations to determine when to return from an MPI-2 one-sided synchronization function; and creating a mpci_wait_loop function for awaiting the completion of RMA operations.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for a method for implementing Message Passing Interface (MPI-2) one-sided communication by using Low-level Applications Programming Interface (LAPI) active messaging capabilities.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
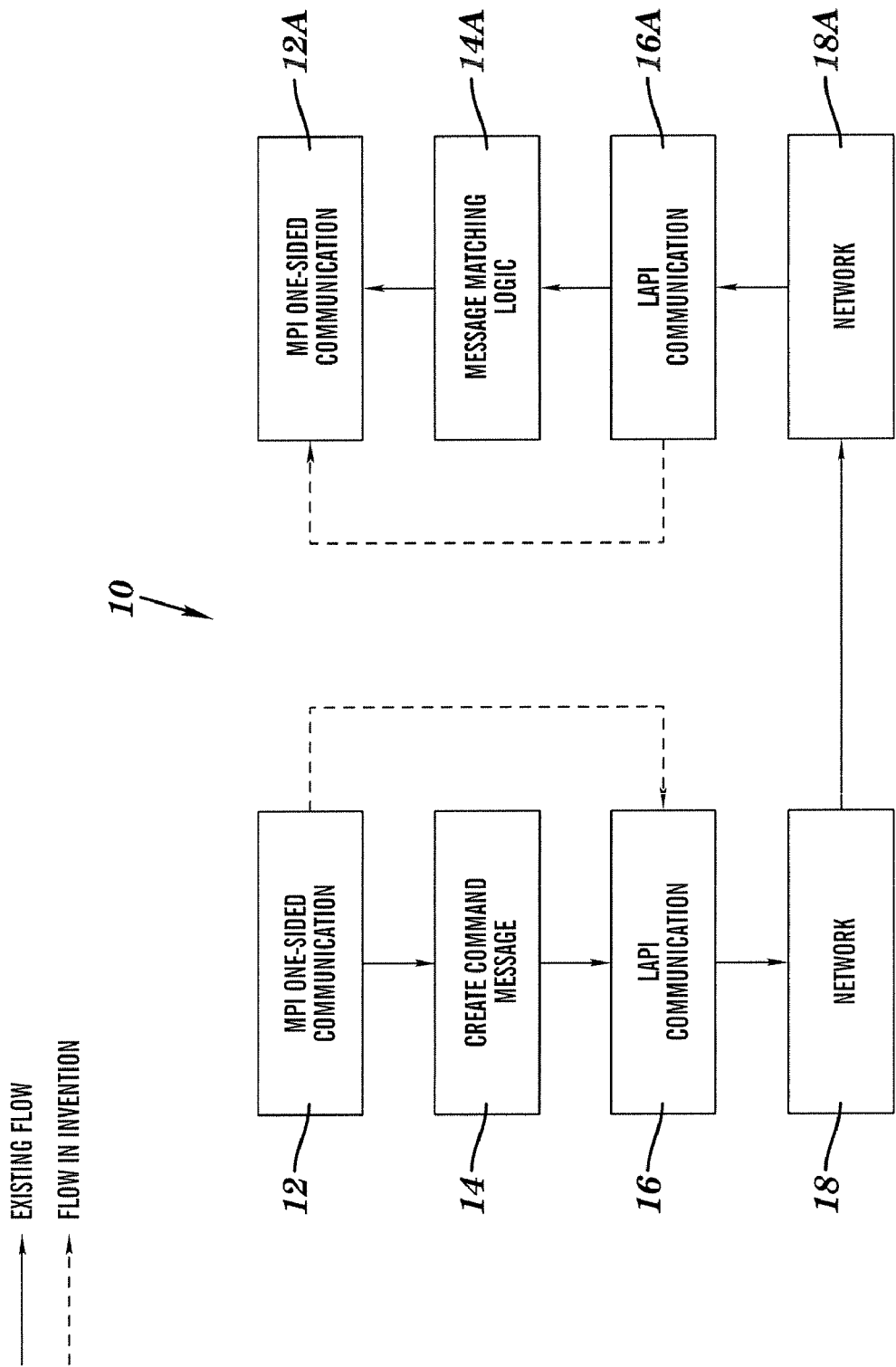
FIG. 1 illustrates one example of an implementation for MPI one-sided communication according to the exemplary embodiments of the present invention.

One aspect of the exemplary embodiments is a method for improving the Message Passing Interface (MPI) one-sided communication by replacing the Message Passing Client Interface (MPCI) calls with direct use of Low-level Applications Programming Interface (LAPI) Application Programming Interface (APIs). Another aspect of the exemplary embodiments of the present invention is a MPI-2 one-sided communication that is built directly on top of LAPI, exploiting the one-sided nature of that transport.

The LAPI one-sided functionality, which became available to MPI, is a better fit to an efficient implementation of MPI-2 one-sided communications. The data transfer operations of MPI-2 one-sided, MPI_Put, MPI_Get and MPI_Accumulate are asynchronous. They are often lumped together under the term Remote Memory Access (RMA) operations. MPI-2 one-sided RMA operations do not complete until some explicit synchronization has been done. The terms "asynchronous" and "complete" are used in their formal MPI sense, meaning that once an RMA is initiated, its source buffer is not to be modified and its destination buffer is not to be referenced until the operation is "complete".

The purpose of one-sided communication is to allow one process to specify communication parameters for both the origin side and the target side. Note that "origin" in this context identifies the task on which Put/Get/Accumulate calls occur and "target" identifies the task which has its window accessed. The terms are independent of the direction the data moves. Though the semantic of MPI-2 one-sided communication is specified in terms of a MPI_Send/Recv command, the information required to carry that out can be managed from the origin without using send/recv or the message matching operation if the correct information is exchanged at a MPI_Win_create and if the underlying transport has the correct tools.

The existing implementation provided a MPI-2 one-sided communication that was built on top of two-sided (point-to-point) communication because that is all that MPCI offers. The original approach was to post a non-blocking mpci_recv command with a function pointer that identified a handler for each window. Each MPI_Win_create operation associated a new, hidden communicator with the MPI Window. A message directed to the mpci_recv at some target caused MPCI to activate the handler on a responder thread and that handler would interpret the message as a "command". The "command" would inform the target on how to issue the mpci_recv (for put) command or the mpci_send (for get) operation, which would match the mpci_send or mpci_recv commands, which would be posted at the origin.

In effect, the target parameters specified at the origin call to MPI_Put/Get/Accumulate were shipped over to the target so the target could perform its half of a two-sided message passing. The delivery of commands and the running of a responder thread via MPCI was very cumbersome. After the command responder finished, it would post a new mpci_recv command with function pointer so that the next "command" could be taken. The thread context switching for every command made this implementation expensive and the serialization of long running command responders made scaling poor.

As a result of this poor performance, in the exemplary embodiments of the present invention, the transport layer on the protocol stack has been changed from two-sided communication model (MPCI) to one-sided model (LAPI). The exemplary embodiments of the present invention take advantage of this one-sided, active message communication model and call LAPI API directly for MPI-2 one-sided communication to eliminate the message matching operations and MPCI responder facility's context switching.

An overview of the current and improved implementations is shown in FIG. 1. Referring to FIG. 1, the current implementation of MPI-2 one-sided communication involves steps 12-18 and 18A-12A. In other words, at step 12 the MPI one-sided communication commences. At step 14, the command message is created. At step 16, LAPI communication is used. At steps 18-18A, a network processes the communications. At step 16A, LAPI reads the data from the network and point-to-point message matching logic is applied 14A. The message matching also sets up the path for data to be accessed at target 12A. In the implementation described by the exemplary embodiments of the present invention, steps 14 and 14A are eliminated from the process. In other words, the command creation and point-to-point matching logic are skipped and the process directly flows to the LAPI capabilities.

The MPI one-sided functionality uses LAPI active messaging capabilities natively, rather than interposing a two-sided mechanism. The target data representation (DGSP—data gather/scatter program) and data are sent as one message. A new LAPI transfer function, allowing a multi-packet header is provided. A new header handler reads the DGSP and registers it with LAPI, thus allowing LAPI to scatter the incoming data to the correct memory locations. A new completion handler unregisters the DGSP.

Synchronization functions required by the MPI standard are implemented by comparing local and remote counts of completed operations and waiting until the counts are equal. For the MPI_Win_fence synchronization, all-to-all exchange of the counts is utilized. For MPI_Start/Complete/Post/Wait and MPI_Lock/Unlock, remote/local exchange of counts is accomplished by using LAPI_Xfer to distribute the completion counts to the participating remote tasks. The solution is fully threaded and does not block on-going computations.

LAPI is a fully threaded transport. The first packet of a message contains the address or list entry of a "header handler" function to be executed at the receiving side. For two-sided communication, the header handler function (provided by the MPI layer) does whatever message matching the receiving side requires, allocates space if necessary, and returns the address of the user buffer for the message and the handle to a data type descriptor. It may also specify that a completion handler function be run by LAPI when the message has been completely copied into the user's buffer. Additional packets of the message are copied directly into the user's buffer without specific receiver involvement, using the data type descriptor to scatter data as required. This may occur on an asynchronous thread, allowing overlap of computation and communication if additional processors are available. For one-sided messages, there is no explicit message matching nor space allocation, but the remaining steps are performed.

In addition, LAPI natively supports user-defined data types, using an encoding referred to as DGSP, and uses DGSP for gather/scatter on the fly, rather than copying discontiguous data into an intermediate buffer. MPI uses this mechanism to encode user-defined MPI data types, making transfer of discontiguous data relatively efficient. In the implementation of MPI-2 one-sided operations, the origin ships the target DGSP. In the initial implementation, the DGSP is shipped as part of the command message if it is short enough, otherwise it is shipped as a separate message to the target. The DGSP is registered with and stored by LAPI for use with the one-sided data. When the one-sided call is complete, the DGSP is unregistered and the LAPI storage is released.

The exemplary embodiments of the present invention use two existing LAPI data transfer types: LAPI_AM_XFER, LAPI_DGSP_XFER and a new data transfer type named LAPI_AMX_XFER. In general, LAPI active message functions allow the user of LAPI (or LAPI client) to specify a header handler to be executed at the target once the complete header of the message arrives at the target. The user's header handler may specify a completion handler. The completion handler can be used for processing the work when a message is completed.

The synchronization mechanism of MPI one-sided communications defines the time at which the user can initiate one-sided communication and the time when the operations are guaranteed to be completed. The following three synchronization mechanisms are provided:

(1) The MPI_Win_fence collective synchronization call which is used for active target communication, where data is moved from the memory of one process to the memory of another, and both are explicitly involved in the communication. An access epoch at the origin or an exposure epoch at a target are started and completed by calls to MPI_Win_fence.

(2) The four functions: MPI_Win_start, MPI_Win_complete, MPI_Win_post, MPI_Win_wait can be used to enable a subset of the window group to engage in data transfer. In this operation, each task explicitly lists the tasks it wishes to communicate with and the role (origin or target) it is going to play. An access epoch is started at the origin by a call to MPI_Win_start and is terminated by a call to MPI_Win_complete. An exposure epoch is started at the target by a call to MPI_Win_post and is completed by a call to MPI_Win_wait.

(3) Shared and exclusive locks are provided by the two functions MPI_Win_lock and MPI_Win_unlock. Lock synchronization is useful for MPI applications that emulate a shared memory model via MPI calls. An access epoch is started by a call to MPI_Win_lock and terminated by a call to MPI_Win_unlock. Only one target window can be accessed during that epoch with window group.

To support these synchronization mechanisms with the communication model including the at least three data transfer types the exemplary embodiments define two different sets of counters. One counter set is for keeping track of the state of the prospective communication partner; the other counter set is for recording the activities of local and remote RMA operations for an epoch. These counters are the key for synchronization calls to determine whether a synchronization operation is complete. In addition to the counters, a new function named mpci_wait_loop is created. The function is used for awaiting the completion of the RMA operations in the synchronization calls.

The exemplary embodiments also create a wrapper named mpci_wait_loop which calls the existing MSG_WAIT_LOOP_TQ macros in MPCI for monitoring communication progress while waiting for a specified condition to be satisfied. The caller can specify an event or condition that he/she is waiting for and pass it to mpci_wait_loop in which LAPI dispatcher is called and the specified condition is periodically checked. Once the specified condition is satisfied, the function returns control to the caller.

The initial implementation used an index to a single linked queue for tracking the progress of the data transfer. The message matching operation guarantees that the messages are completed in the order that the messages were sent; thus a single linked queue works well with MPCI two-sided API's. But since LAPI does not guarantee the delivery of the messages in the order in which the messages are sent, a single linked list is not efficient. To ensure the message queue is managed in an efficient manner, the exemplary embodiments of the present invention use a double linked list instead of a single linked list. This modification allows an entry to be freed immediately once it is no longer required and it also guarantees that at any given time, all freed or unused entries are always linked in the free list, which avoids searching the list for a free entry.

In MPI one-sided communication, the sender specifies the datatypes for both the send side and receive side. For LAPI to interpret the data at the receive side, a copy of Data Gather and Scatter Programs (DGSP), which describes the datatype, is sent with the data. Once the data has arrived at the receive side, LAPI can use the DGSP to interpret the data. A new data transfer type named LAPI_AMX_XFER is supported by the exemplary embodiments of the present invention. This new transfer type (LAPI_AMX_XFER) allows the user to send a message with a message header greater than one packet. With the new transport type, the DGSP can be placed as part of the message header and can be sent along with the actual data using only one LAPI_Xfer call. When the complete header arrives at the receive side, the header handler is invoked, the DGSP is registered with LAPI, and the registered DGSP handle and the receive buffer are passed to LAPI for gathering and scattering the data. The transfer of non-contiguous data with the new transfer type eliminates the use of rendezvous protocol or making multiple trips across the network.

Moreover, MPI_Put and MPI_Accumulate are functions that transfer data from the caller memory (origin) to the target memory. The operation is a non-blocking operation. From the origin-target communication protocol point of view, MPI_Accumulate is the same as that of MPI_Put. The difference is that the data being transferred combines the data at the existing local window, and that introduces additional complexities.

Figure 2:
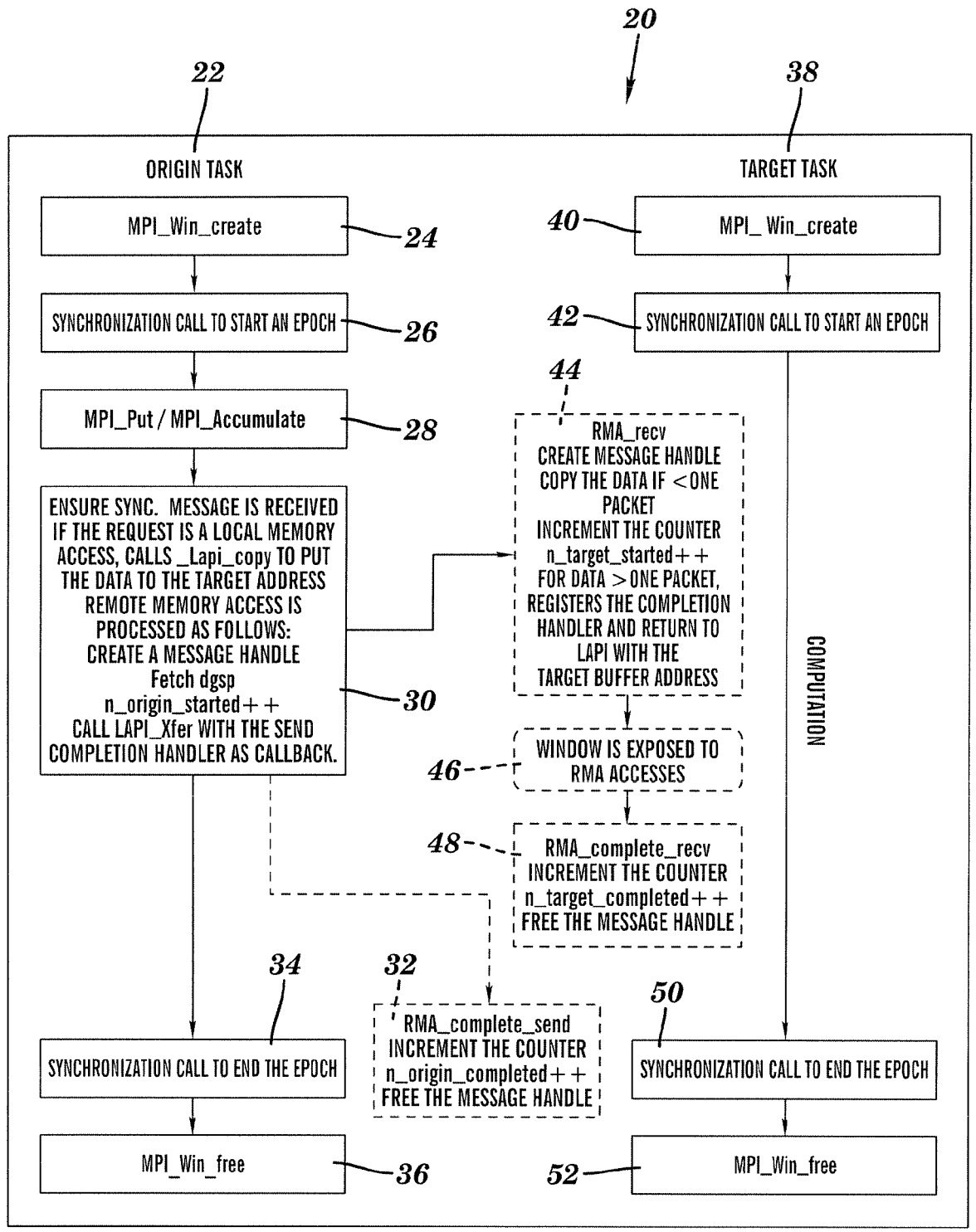
FIG. 2 illustrates one example of a Remote Memory Access (RMA) communication (MPI_Put/MPI_Accumulate) by using LAPI_Xfer according to the exemplary embodiments of the present invention.

FIG. 2 outlines the flow of MPI_Put and MPI_Accumulate 20 using LAPI_Xfer for transferring the data. The operation starts at the origin task 22, using MPI_Win_create command 24, initiating synchronization calls 26, and issuing MPI_Put or MPI_Accumulate 28 which then calls LAPI_Xfer 30 to send the actual data and a message header containing the address, count, datatype and/or DGSP information for the target 38. After LAPI_Xfer 30 is called, the process may do computations before flowing to the synchronization call 34. During computation, the completion process RMA_complete_send 32 may be invoked asynchronously to update origin completion counters. Completion counters may also be updated during the synchronization call 34. Then, the process completes at MPI_Win_free 36.

Once the data arrives at the target 38, the header hander calls LAPI_Util 44 to register DGSP if there is one. The registered DGSP, LAPI handle and the target address are passed to LAPI for scattering the data to the target buffer. The completion handler is invoked in a manner such that the completion counter is updated and the DGSP and entry in the message queue that keeps track of the state of the message being processed are freed 48. Therefore, the operation starts at the target task 38, using MPI_Win_create command 40, and initiating synchronization calls 42. Copying of contiguous data to the target buffer is performed by either the header handler 44 or by LAPI exposing the window 46 to RMA access. After synchronization 42, the process may perform computation before flowing to the synchronization call end 50. During computation the step RMA_complete_recv 48 may be performed asynchronously. Completion counters may also be updated during the synchronization call 50. Then, the process completes at MPI_Win_free 54.

To control the reduction at the target when doing an Accumulate, the delivery of a DGSP is always required even when data is contiguous. The steps for an "accumulate" are: At the origin, there is an origin datatype specified and for a normal MPI_Put, that datatype can be used by the LAPI_Xfer call as is. An MPI_Accumulate involves discrete items, which are combined one by one with items at the target, and the normal packetization done by LAPI does not know of or respect the bounds between these items. Special handling is required to get LAPI to respect these bounds and that requires a DGSP, which specifies an atom size. A DGSP for the registered MPI datatype used in the MPI_Accumulate call does not specify an atom size because having one can make packet payloads inefficient. Before the LAPI_Xfer call to carry out an "accumulate" can be made, a temporary datatype is created with an appropriate atom size, and registered by calling LAPI_Util. That datatype forces LAPI to fill each packet with an integral number of items on which the reduction can occur at the target.

As a result, internal communication model changes in the MPI one-sided implementation have been achieved, new methodologies defining synchronization operations have been implemented, the performance for one-sided communication has been improved, a new type of LAPI_Xfer named LAPI_AMX_XFER has been developed so that MPI can deliver an arbitrary size target side DGSP (Data Gather Scatter Program) and associated data in a single LAPI_Xfer call. Two-sided bandwidth and latency for point-to-point are not affected the exemplary embodiments of the present invention.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing Message Passing Interface (MPI-2) one-sided communication by using Low-level Applications Programming Interface (LAPI) active messaging capabilities, the method comprising:
   supporting a plurality of data transfer types;
   providing at least three data transfer types, one of which is used to send a message with a message header greater than one packet where Data Gather and Scatter Programs (DGSP) are placed as part of the message header;
   allowing a multi-packet header by using a LAPI data transfer type;
   sending the DGSP and data as one message;
   reading the DGSP with a header handler;
   registering the DGSP with the LAPI to allow the LAPI to scatter the data to one or more memory locations;
   defining two sets of counters, one counter set for keeping track of a state of a prospective communication partner, and another counter set for recording activities of local and Remote Memory Access (RMA) operations;
   comparing local and remote counts of completed RMA operations to indicate completion of synchronization mechanisms invoked by a user; and
   creating a mpci_wait_loop function for awaiting the completed RMA operations.

2. The method of claim 1, wherein a first synchronization mechanism is a synchronization mechanism used for active target communication, where the data is moved from the one or more memory locations to other memory locations.

3. The method of claim 1, wherein a second synchronization mechanism is a synchronization mechanism used for enabling a subset of a window group to engage in data transfer.

4. The method of claim 1, wherein a third synchronization mechanism is a synchronization mechanism used for MPI applications that emulate a shared memory model via MPI calls.

5. The method of claim 1, further comprising creating a wrapper mpci_wait_loop which calls existing MSG_WAIT_LOOP_TQ macros in Message Passing Client Interface (MPCI) for monitoring communication progress while waiting for a specified condition to be satisfied.

6. The method of claim 1, wherein tracking a progress of data transfer is performed by using a double linked list to ensure that the data is linked.

7. A system for implementing Message Passing Interface (MPI-2) one-sided communication by using Low-level Applications Programming Interface (LAPI) active messaging capabilities, the system comprising:
   a network; and
   a host system in communication with the network, the host system including software to implement a method comprising:
      supporting a plurality of data transfer types;
      providing at least three data transfer types, one of which is used to send a message with a message header greater than one packet where Data Gather and Scatter Programs (DGSP) are placed as part of the message header;
      allowing a multi-packet header by using a LAPI data transfer type;
      sending the DGSP and data as one message;
      reading the DSGP with a header handler;
      registering the DSGP with the LAPI to allow the LAPI to scatter the data to one or more memory locations;
      defining two sets of counters, one counter set for keeping track of a state of a prospective communication partner, and another counter set for recording activities of local and Remote Memory Access (RMA) operations;
      comparing local and remote counts of completed RMA operations to indicate completion of synchronization mechanisms invoked by a user; and
      creating a mpci_wait_loop function for awaiting the completed RMA operations.

8. The system of claim 7, wherein a first synchronization mechanism is a synchronization mechanism used for active target communication, where the data is moved from the one or more memory locations to other memory locations.

9. The system of claim 7, wherein a second synchronization mechanism is a synchronization mechanism used for enabling a subset of a window group to engage in data transfer.

10. The system of claim 7, wherein a third synchronization mechanism is a synchronization mechanism used for MPI applications that emulate a shared memory model via MPI calls.

11. The system of claim 7, further comprising creating a wrapper mpci_wait_loop which calls existing MSG_WAIT_LOOP_TQ macros in Message Passing Client Interface (MPCI) for monitoring communication progress while waiting for a specified condition to be satisfied.

12. The system of claim 7, wherein tracking a progress of data transfer is performed by using a double linked list to ensure that the data is linked.

13. A computer program product for implementing Message Passing Interface (MPI-2) one-sided communication by using Low-level Applications Programming Interface (LAPI) active messaging capabilities, the computer program product comprising:
   a storage medium readable by a processing circuit and storing instructions for execution by the processing circuit for performing a method comprising:
      supporting a plurality of data transfer types;
      providing at least three data transfer types, one of which is used to send a message with a message header greater than one packet where Data Gather and Scatter Programs (DGSP) are placed as part of the message header;
      allowing a multi-packet header by using a LAPI data transfer type;
      sending the DGSP and data as one message;
      reading the DSGP with a header handler;
      registering the DSGP with the LAPI to allow the LAPI to scatter the data to one or more memory locations;
      defining two sets of counters, one counter set for keeping track of a state of a prospective communication partner, and another counter set for recording activities of local and Remote Memory Access (RMA) operations;
      comparing local and remote counts of completed RMA operations to indicate completion of synchronization mechanisms invoked by a user; and
      creating a mpci_wait_loop function for awaiting the completed RMA operations.

14. The computer program product of claim 13, wherein a first synchronization mechanism is a synchronization mechanism used for active target communication, where the data is moved from the one or more memory locations to other memory locations.

15. The computer program product of claim 13, wherein a second synchronization mechanism is a synchronization mechanism used for enabling a subset of a window group to engage in data transfer.

16. The computer program product of claim 13, wherein a third synchronization mechanism is a synchronization mechanism used for MPI applications that emulate a shared memory model via MPI calls.

17. The computer program product of claim 13, further comprising creating a wrapper mpci_wait_loop which calls existing MSG_WAIT_LOOP_TQ macros in Message Passing Client Interface (MPCI) for monitoring communication progress while waiting for a specified condition to be satisfied.

18. The computer program product of claim 13, wherein tracking a progress of data transfer is performed by using a double linked list to ensure that the data is linked.

* * * * *